United States Patent Office 2,707,187
Patented Apr. 26, 1955

2,707,187

CHEMICAL PROCESS

John H. Koehneke, Kalamazoo, and Merrill E. Speeter, Kalamazoo Township, Kalamazoo County, Mich., assignors to The Upjohn Company, Kalamazoo, Mich., a corporation of Michigan No Drawing. Application July 14, 1952,
Serial No. 298,838

10 Claims. (Cl. 260—319)

The present invention relates to a novel process for the preparation of organic compounds, and is more particularly concerned with a novel process for the preparation of 2-substituted-5-benzyloxyindoles and with the products thus produced. This application is a continuation-in-part of our prior-filed copending application Serial Number 292,188, filed June 6, 1952.

The compounds prepared by the novel process of the present invention may be represented by the formula:

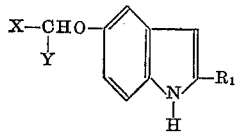

wherein X represents phenyl, halophenyl, lower alkoxyphenyl, and lower alkylphenyl, Y represents hydrogen, phenyl, halophenyl, lower alkoxyphenyl, and lower alkylphenyl, and $R_1$ represents alkyl, phenyl, halophenyl, lower alkoxyphenyl, and lower alkylphenyl.

It is an object of the present invention to provide a novel process for the preparation of 2-substituted-5-benzyloxyindoles. It is a further object of the present invention to provide a novel process for the preparation of 2-alkyl-5-benzyloxyindoles and 2-phenyl-5-benzyloxyindoles. Other objects of the invention will be apparent to those skilled in the art to which the invention pertains.

The compounds of the present invention are important intermediates in the preparation of serotonin analogs, Serotonin, 5-hydroxy-3-(2-aminoethyl)-indole, isolated by Rapport [J. Biol. Chem. 180, 961 (1949)], has been shown to possess powerful vasoconstrictor qualities, and the analogs thereof, such as the 2-methyl-5-hydroxy-3-[2-(N-methylamino)-ethyl]-indole, 2-phenyl-5-hydroxy-3-[2-(N,N-dimethylamino)-ethyl]-indole and the like, prepared from the compounds of the present invention, are also potent vasoconstrictors. In the preparation of the serotonin analogs, the compounds of the present invention, the 2-substituted-5-benzyloxyindoles, are reacted with a haloalkanoylamide, e. g., an α-haloacetamide, such as α-chloro-N-benzylacetamide, in a Grignard reaction, to produce a (5-benzyloxy-3-indole)-alkanoylamide, e. g., α-3-(5-benzyloxy-2-methylindole)-N-benzylacetamide, as fore fully disclosed in the copending application of Merrill E. Speeter, Serial Number 279,931, filed April 1, 1952. The (5-benzyloxy-3-indole)-alkanoylamides are reduced with a suitable reducing agent, e. g., lithium aluminum hydride, to produce a (5-benzyloxy-3-indole)-alkylamine, e. g., 2-methyl-5-benzyloxy-3-[2-(N-benzylamino)-ethyl]-indole, and salts thereof, as more fully disclosed in the copending application of Merrill E. Speeter, Serial Number 282,273, filed April 14, 1952. The (5-benzyloxy-3-indole)-alkylamines are subjected to hydrogenolysis in the presence of a catalyst to produce the serotonin analogs (5-hydroxy-3-indole)-alkylamines, and salts thereof, as more fully disclosed in the copending application of Merrill E. Speeter, Serial Number 289,872, filed May 24, 1952.

According to the method of the present invention, the 2-substituted-5-benzyloxyindoles are prepared by hydrolyzing and decarboxylating a 5-benzyloxy-3-carbalkoxyindole with an aqueous alkaline hydrolyzing agent in the presence of heat.

The decarboxylation of carboxyindoles has been previously attempted. Other workers such as Burton et al. (J. Chem. Soc., 1937, 1726) decarboxylated the 5-hydroxyindole-2-carboxylic acid with considerable difficulty. Burton et al. and subsequent workers, were able to decarboxylate under very strenuous conditions, e. g., heating from 225 to 230 degrees centigrade in the presence of glycerol and extracting repeatedly with light petroleum to produce the desired decarboxylated indole. Burton et al. attempted to decarboxylate with heat alone, but the process resulted merely in unworkable tars and was unsatisfactory. The comparative ease of decarboxylation of the 2-substituted-5-benzyloxy-3-carbalkoxyindole in the process of the present invention is therefore entirely unobvious.

The starting 2-substituted-5-benzyloxy-3-carbalkoxyindoles, represented by the formula:

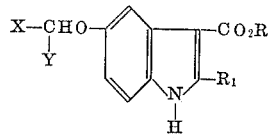

wherein R represents lower alkyl and X, Y, and $R_1$ have the values specified above, are prepared by reacting a 2-substituted-5-hydroxy-3-carbalkoxyindole with a benzylating agent, e. g., a benzyl halide represented by the formula:

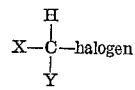

wherein X and Y have the values represented above. Representative benzylating compounds include benzyl chloride, para-methylbenzyl bromide, para-methoxybenzyl iodide, benzhydryl chloride, para,para'-dibromobenzhydryl chloride, and the like. The benzylation is preferably conducted in the presence of a solvent such as water, ethanol, methanol, isopropanol, and the like, with ethanol being preferred, and a base such as the alkali-metal alkoxides, e. g., sodium ethoxide, potassium propoxide, and the like, or the alkali-metal carbonates, e. g., sodium carbonate, potassium carbonate, lithium carbonate, and the like. In some instances calcium or sodium hydroxide may be utilized. The benzylation is preferably completed at the boiling point of the reaction mixture involved, preferably under nitrogen, although other temperatures between about fifty and 150 degrees centigrade may also be utilized. The reaction is usually complete after a period between about two and five hours, the shorter reaction periods being satisfactory at higher temperatures, whereafter the reaction mixture may be poured into water to precipitate the desired 2-substituted-5-benzyloxy-3-carbalkoxyindole, and the 2-substituted-5-benzyloxy-3-carbalkoxyindole recovered by filtration. The 2-substituted-5-benzyloxy-3-carbalkoxyindole may be further purified, if so desired, by boiling with dry ether, cooling, and washing the filtered solid with alkali. The solid 2-substituted-5-benzyloxy-3-carbalkoxyindole may also be recrystallized, if so desired, from the alcohols such as secondary butanol, tertiary butanol, amyl alcohol, and the like.

The 2-substituted-5-hydroxy-3-carbalkoxyindoles are prepared by the condensation of quinone with an alkyl β-aminoacrylate represented by the formula:

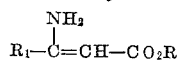

wherein R and $R_1$ have the values specified above. The 2-alkyl-5-hydroxy-3-carbalkoxyindoles are prepared by the reaction of quinone with an alkyl β-aminocrotonate, more specifically for example with ethyl β-aminocrotonate, to produce the desired 2-alkyl-5-hydroxy-3-carbalkoxyindole. Other representative alkyl β-aminocrotonates which are employed in the method of the present invention include the following: propyl β-aminocrotonate, butyl β-aminocrotonate, amyl β-aminocrotonate, and the like. The method disclosed by Nenitzescu [Bull. Soc. Chim., Romania, 11, 37–43 (1929)], may be followed generally in the preparation of the 2-alkyl-5-hydroxy-3-carbalkoxyindoles. The 2-phenyl-5-hydroxy-3-carbalkoxyindoles are prepared by reacting quinone with an alkyl β-aminocinnamate, such as ethyl β-aminocinnamate, ethyl β-amino-para-methylcinnamate, propyl β-amino-para-chlorocinnamate, and the like. The alkyl β-aminocinnamates, utilized in the preparation of the 2-phenyl-5-hydroxy-3-carbalkoxyindoles, are prepared by the reaction of an alkyl benzoylacetate with ammonia.

In carrying out the process of the present invention, the hydrolysis and decarboxylation of the starting 2-substituted-5-benzyloxy-3-carbalkoxyindoles is usually accomplished by reacting the 2-substituted-5-benzyloxy-3-carbalkoxyindole, dissolved in a suitable organic solvent such as ethanol, isopropanol, butanol, or the like, with an aqueous solution of an alkali-metal hydroxide or carbonate such as sodium hydroxide, lithium hydroxide, potassium hydroxide, sodium carbonate, potassium carbonate, or the like. The reaction is suitably accomplished at the boiling point of the solvent utilized although other temperatures between about sixty and about 125 degrees centigrade may also be employed. The reaction is generally complete in a period of ten to twenty-five hours, a shorter time being satisfactory at the higher temperatures, whereupon the resulting decarboxylated 2-substituted-5-benzyloxyindole may be obtained from the reaction mixture by various extraction procedures. According to one procedure, the 2-substituted-5-benzyloxyindole is extracted by mixing the reaction mixture with an organic solvent such as ether, chloroform, or benzene, with ether being preferred, to form an ether layer and an alkaline layer. If the separation is not clearly defined, water may be added to the ether mixture to clearly separate the mixture into an ether layer and alkaline layer. Upon drying and concentrating the ether layer in a conventional manner, the 2-substituted-5-benzyloxyindole is obtained and may, if so desired, be further purified by recrystallization from benzene-methylcyclohexane, benzene-petroleum ether, ethyl acetate-petroleum ether, methylcyclohexane, or the like, with benzene-methylcyclohexane being preferred. The alkaline layer, resulting from the ether extraction, when reacted with an acid such as acetic, hydrochloric, sulfuric, nitric, or the like, yields 2-substituted-5-benzyloxy-3-carboxyindole as a precipitate. The 2-substituted-5-benzyloxy-3-carboxyindole is readily decarboxylated to form the desired 2-substituted-5-benzyloxyindole upon heating to a temperature between about 60 and about 125 degrees centigrade for a period between about one and four hours. In an alternative extraction procedure the mixture which results from the hydrolysis reaction can be immediately acidified, as with an acid selected from the group specified above, the resulting mixture heated to a temperature between about 60 and about 125 degrees centigrade for a period between about one to four hours, whereafter the mixture is extracted with an organic solvent and the 2-substituted-5-benzyloxyindole is recovered from the solvent extract upon drying and concentrating in a conventional manner.

The following examples will serve to illustrate the process of this invention, but the said invention is not to be considered as limited thereto.

PREPARATION 1.—2-METHYL-5-BENZYLOXY-3-CARBETHOXYINDOLE

To 2.9 grams (0.126 mole) of sodium was added 175 milliliters of absolute ethanol and to the sodium ethoxide thus prepared was added 2.7 grams (0.123 mole) of 2-methyl-5-hydroxy-3-carbethoxyindole and 16.5 grams (0.13 mole) of benzyl chloride. The mixture was refluxed under nitrogen for two hours, poured into water, and the 2-methyl-5-benzyloxy-3-carbethoxyindole filtered therefrom. The 2-methyl-5-benzyloxy-3-carbethoxyindole was boiled with 500 milliliters of dry ether, cooled, filtered, and washed with aqueous sodium hydroxide. A yield of 9.5 grams of 2-methyl-5-benzyloxy-3-carbethoxyindole, was obtained melting at 152–152.5 degrees centigrade.

*Analysis.*—Percent calculated for $C_{19}H_{19}NO_3$: C, 73.75; H, 6.19. Found: C, 73.78; H, 6.12.

Other representative 2 - substituted - 5 - benzyloxy - 3-carbalkoxyindoles which are prepared by reacting a chosen 2-substituted-5-hydroxy-3-carbalkoxyindole with the selected benzylating agent include the following: 2-phenyl-5-benzhydryloxy-3-carbomethoxyindole, 2-(para-methylphenyl) - 5 - (para,para' - dimethoxybenzhydryloxy) - 3 - carbomethoxyindole, 2 - (para - chlorophenyl) - 5 - (para,para' - dimethylbenzhydryloxy) - 3 - carbethoxyindole, 2 - (para - methoxyphenyl) - 5 - (para,para' - dichlorobenzhydryloxy) - 3 - carbopropoxyindole, and the like.

*Example 1.—2-methyl-5-benzyloxyindole*

To five grams of 2-methyl-5-benzyloxy-3-carbethoxyindole was added a solution of ten grams of potassium hydroxide in ten milliliters of water and fifty milliliters of 95 percent ethanol. The mixture was refluxed for eighteen hours and thereafter poured into water, whereupon a gummy mass separated. The mixture was extracted with ether which resulted in an ether and an alkaline layer. The ether layer was dried and concentrated and the resulting crystalline solid was recrystallized from benzene-methylcyclohexane and finally from methylcyclohexane alone to yield 2-methyl-5-benzyloxyindole. The yield of 2-methyl-5-benzyloxyindole was four grams, which melted at 81–82 degrees centigrade. Additional 2-methyl-5-benzyloxyindole was obtained by acidifying the alkaline layer, resulting from the ether extraction, with hydrochloric acid, and the light brown precipitate, 2-methyl-5-benzyloxy-3-carboxyindole, thus obtained, was thereafter filtered and dried. The precipitate was further heated to ninety degrees centigrade for one hour to yield the desired 2-methyl-5-benzyloxyindole.

*Analysis.*—Percent calculated for $C_{16}H_{15}NO$: C, 80.97; H, 6.37; N, 5.90. Found: C, 81.11; H, 6.42; N, 5.63.

In the same manner the following 2-alkyl-5-benzyloxyindoles are prepared by hydrolyzing and decarboxylating the corresponding 2-alkyl-5-benzyloxy-3-carbalkoxyindole: 2 - ethyl - 5 - benzyloxyindole, 2 - propyl - 5 - benzyloxyindole, 2-hexyl-5-benzyloxyindole, 2-octyl-5-benzyloxyindole, and the like.

*Example 2.—2-phenyl-5-benzhydryloxyindole*

In essentially the same manner as given in Example 1, 2-phenyl-5-benzhydryloxyindole is prepared by hydrolyzing and decarboxylating 2-phenyl-5-benzhydryloxy-3-carbomethoxyindole dissolved in isopropanol with aqueous sodium hydroxide.

In the same manner the following 2-substituted-5-benzyloxyindoles are prepared by hydrolyzing and decarboxylating the corresponding 2-substituted-5-benzyloxy-3-carbalkoxyindole: 2-ethyl-5-benzhydryloxyindole, 2-propyl-5-benzhydryloxyindole, 2-(para-methylphenyl)-5-benzhydryloxyindole, 2-(meta-chlorophenyl)-5-benzhydryloxyindole, 2-(para-propoxyphenyl) - 5 - benzhydryloxyindole, and the like.

*Example 3.—2-(para-chlorophenyl)-5-(para,para'-dimethylbenzhydryloxy)-indole*

In essentially the same manner as given in Example 1, 2 - (para - chlorophenyl) - 5 - (para,para'-dimethylbenzhydryloxy)-indole is prepared by hydrolyzing and decarboxylating 2-(para-chlorophenyl)-5-(para,para'-dimethylbenzhydryloxy)-3-carbethoxyindole dissolved in ethanol with aqueous sodium carbonate.

In the same manner the following 2-substituted-5-benzyloxyindoles are prepared by hydrolyzing and decarboxylating the corresponding 2-substituted-5-benzyloxy-3-carbalkoxyindole: 2-phenyl-5-(para-methylbenzyloxy)-indole, 2-propyl - 5 - (para,para'-diethylbenzhydryloxy)-indole, 2-(para-iodophenyl) - 5 - (para-propylbenzyloxy)-indole, and the like.

*Example 4.—2-(para-methylphenyl)-5-(para,para'-dimethoxybenzhydryloxy)-indole*

In essentially the same manner as given in Example 1, 2 - (para - methylphenyl) - 5 - (para,para' - dimethoxybenzhydryloxy)-indole is prepared by hydrolyzing and decarboxylating 2-(para-methylphenyl)-5-(para,para'-dimethoxybenzhydryloxy) - 3 - carbomethoxyindole dissolved in butanol with aqueous potassium carbonate.

In the same manner the following 2-substituted-5-benzyloxyindoles are prepared by hydrolyzing and decarboxylating the corresponding 2-substituted-5-benzyloxy-3-carbalkoxyindole: 2-phenyl-5-(para-ethoxybenzyloxy)-indole, 2-ethyl-5-(para,para'-dimethoxybenzhydryloxy)-indole, 2-(para-propylphenyl)-5-(para-ethoxybenzyloxy)-indole, and the like.

*Example 5.—2-(para-methoxyphenyl) - 5 - (para,para'-dichlorobenzhydryloxy)-indole*

In essentially the same manner as given in Example 1, 2-(para-methoxyphenyl) - 5 - (para,para'-dichlorobenzhydryloxy)-indole is prepared by a hydrolyzing and dicarboxylating 2-(para-methoxyphenyl) - 5 - (para,para'-dichlorobenzhydryloxy)-3-carbopropoxyindole dissolved in ethanol with aqueous potassium hydroxide.

In the same manner the following 2-substituted-5-benzyloxyindoles are prepared by hydrolyzing and decarboxylating the corresponding 2-substituted-5-benzyloxy-3-carbalkoxyindole: 2-phenyl-5-(para-bromobenzyloxy)-indole, 2-methyl - 5 - (para-para'-dichlorobenzhydryloxy)-indole, 2-(para-ethoxyphenyl) - 5 - (para-iodobenzyloxy)-indole, and the like.

It is to be understood that this invention is not to be limited to the exact details of operation or exact compounds shown and described, as obvious modifications and equivalents will be apparent to one skilled in the art, and the invention is therefore to be limited only by the scope of the appended claims.

We claim:

1. In the process for the preparation of 2-substituted-5-benzyloxyindoles, the steps of hydrolyzing and decarboxylating a 2 - substituted-5-benzyloxy-3-carbalkoxyindole wherein the substituent in the 2 position is selected from the group consisting of alkyl, phenyl, halophenyl, lower alkoxyphenyl, and lower alkylphenyl, by heating the 2-substituted-5-benzyloxy - 3 - carbalkoxyindole together with an aqueous alkaline hydrolyzing agent at a temperature between about sixty and about 125 degrees centigrade, extracting the mixture of reaction products with an organic solvent to form a solvent layer and an alkaline layer, and recovering the 2-substituted-5-benzyloxyindole from the solvent layer.

2. The process of claim 1, wherein the alkaline layer is acidified, and heated to between about sixty and about 125 degrees centigrade, and 2-substituted-5-benzyloxyindole separated therefrom.

3. In a process for the preparation of 2-substituted-5-benzyloxyindoles, the steps of hydrolyzing and decarboxylating a 2 - substituted-5-benzyloxy-3-carbalkoxyindole wherein the substituent in the 2 position is selected from the group consisting of alkyl, phenyl, halophenyl, lower alkoxyphenyl, and lower alkylphenyl, by mixing the 2-substituted - 5 - benzoyloxy-3-carbalkoxyindole together with an aqueous alkaline hydrolyzing agent, acidifying the mixture of reaction products, heating the acidified mixture to between about sixty and about 125 degrees centigrade, extracting the reaction product with an organic solvent, and recovering the 2-substituted-5-benzyloxyindole from the solvent extract.

4. In a process for the preparation of 2-alkyl-5-benzyloxyindoles, the steps of hydrolyzing and decarboxylating a 2-alkyl-5-benzyloxy-3-carbalkoxyindole by heating the 2-alkyl-5-benzyloxy - 3 - carbalkoxyindole together with an aqueous alkaline hydrolyzing agent at a temperature between about sixty and about 125 degrees centigrade, extracting the reaction product with an organic solvent to form a solvent layer and an alkaline layer, and recovering the 2-alkyl-5-benzyloxyindole from the solvent layer.

5. The process of claim 4, wherein the alkaline layer is acidified and heated to between about sixty and about 125 degrees centigrade, and 2-alkyl-5-benzyloxyindole separated therefrom.

6. In a process for the preparation of 2-alkyl-5-benzyloxyindoles, the steps of hydrolyzing and decarboxylating a 2-alkyl-5-benzyloxy-3-carbalkoxyindole by mixing the 2-alkyl-5-benzyloxy-3-carbalkoxyindole together with an aqueous alkaline hydrolyzing agent, acidifying the mixture of reaction products, heating the mixture to between about sixty and about 125 degrees centigrade, extracting the reaction product with an organic solvent, and recovering the 2-alkyl-5-benzyloxyindole from the solvent extract.

7. In a process for the preparation of 2-methyl-5-benzyloxyindoles, the steps of hydrolyzing and decarboxylating a 2-methyl-5-benzyloxy-3-carbalkoxyindole by mixing the 2-methyl-5-benzyloxy-3-carbalkoxyindole together with an aqueous alkaline hydrolyzing agent, heating the mixture to between about sixty and about 125 degrees centigrade, extracting the reaction product with an organic solvent to form a solvent layer and an alkaline layer, and recovering the 2-methyl-5-benzyloxyindole from the solvent layer.

8. In a process for the preparation of 2-substituted-5-benzyloxyindoles, the steps of reacting a 2-substituted-5-hydroxy-3-carbalkoxyindole, wherein the 2-substituent is selected from the group consisting of alkyl, phenyl, halophenyl, lower alkoxyphenyl, and lower alkylphenyl, in a basic solution, with a benzyl halide represented by the formula:

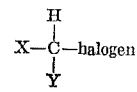

wherein X is selected from the group consisting of phenyl, halophenyl, lower alkoxyphenyl, and lower alkylphenyl, Y is selected from the group consisting of hydrogen, phenyl, halophenyl, lower alkoxyphenyl, and lower alkylphenyl, to produce a 2-substituted-5-benzyloxy-3-carbalkoxyindole, hydrolyzing and decarboxylating the thusproduced 2 - substituted-5-benzyloxy-3-carbalkoxyindole by mixing the 2-substituted-5-benzyloxy-3-carbalkoxyindole together with an aqueous alkaline hydrolyzing agent, heating to between about sixty and about 125 degrees centigrade, and recovering the 2-substituted-5-benzyloxyindole from the reaction products.

9. In a process for the preparation of 2-substituted-5-benzyloxyindoles, the steps of hydrolyzing and decarboxylating a 2-substituted - 5 - benzyloxy-3-carbalkoxyindole by mixing a 2-substituted-5-benzyloxy-3-carbalkoxyindole together with an aqueous alkaline hydrolyzing agent, acidifying and heating the mixture to between about sixty and about 125 degrees centigrade, and recovering the 2-substituted-5-benzyloxyindole from the reaction products.

10. In a process for the preparation of 2-substituted-5-benzyloxyindoles, the step of hydrolyzing and decarboxylating a 2 - substituted-5-benzyloxy-3-carbalkoxyindole wherein the substituent in the 2 position is selected from the group consisting of alkyl, phenyl, halophenyl, lower alkoxyphenyl, and lower alkylphenyl, by heating the 2-substituted-5-benzyloxy-3-carbalkoxyindole together with an aqueous alkaline hydrolyzing agent at a temperature between about sixty and about 125 degrees centigrade.

References Cited in the file of this patent

UNITED STATES PATENTS

| | | |
|---|---|---|
| 2,248,155 | Zellner | July 8, 1941 |
| 2,516,332 | Moe et al. | July 25, 1950 |